(12) United States Patent
Sundholm

(10) Patent No.: US 9,242,808 B2
(45) Date of Patent: Jan. 26, 2016

(54) METHOD AND PNEUMATIC MATERIAL CONVEYING SYSTEM

(75) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 0 days.

(21) Appl. No.: 13/878,498

(22) PCT Filed: Oct. 19, 2011

(86) PCT No.: PCT/FI2011/050910
§ 371 (c)(1),
(2), (4) Date: Apr. 9, 2013

(87) PCT Pub. No.: WO2012/059632
PCT Pub. Date: May 10, 2012

(65) Prior Publication Data
US 2013/0195563 A1    Aug. 1, 2013

(30) Foreign Application Priority Data

Nov. 3, 2010   (FI) .................................... 20106150
Nov. 8, 2010   (FI) .................................... 20106173

(51) Int. Cl.
| | |
|---|---|
| B65G 53/14 | (2006.01) |
| B65G 53/24 | (2006.01) |
| B65F 5/00 | (2006.01) |
| B65G 53/28 | (2006.01) |

(52) U.S. Cl.
CPC ................ *B65G 53/24* (2013.01); *B65F 5/005* (2013.01); *B65G 53/28* (2013.01)

(58) Field of Classification Search
CPC .......... B65G 53/24; B65F 1/105; B65F 6/005
USPC .................................. 406/117, 118, 151–153
See application file for complete search history.

(56) References Cited

U.S. PATENT DOCUMENTS

| | | | | |
|---|---|---|---|---|
| 3,490,813 | A | * | 1/1970 | Hallstrom ..................... 406/130 |
| 3,730,884 | A | * | 5/1973 | Albertsen et al. ............... 406/19 |
| 4,013,551 | A | * | 3/1977 | de Feudis ...................... 209/606 |

(Continued)

FOREIGN PATENT DOCUMENTS

| | | |
|---|---|---|
| CN | 1339008 A | 3/2002 |
| CN | 1612833 A | 5/2005 |
| DE | 1 659 961 A | 10/1970 |

(Continued)

OTHER PUBLICATIONS

EP Patent Office Supplementary Search Report issued on Jun. 18, 2015 regarding the corresponding EP application No. 11837626.8.

*Primary Examiner* — William R Harp
(74) *Attorney, Agent, or Firm* — Birch, Stewart, Kolasch & Birch, LLP

(57) ABSTRACT

A method and system for pneumatically conveying waste material through a conveying system which includes an input point for introducing waste material, at least one main conveying pipe section, at least one branch conveying pipe section, at least one separating device, and at least one pump unit for producing a pressure differential and air current within the operating system, whereby in a first phase, the main conveying pipe section functions as a material reservoir and in a second phase, the waste material is transferred to the separating device by the suction/pressure difference and/or conveying air flow produced by the pump device.

44 Claims, 10 Drawing Sheets

(56) References Cited

U.S. PATENT DOCUMENTS 4,227,451 A * 10/1980 Slavinsky et al. ............. 100/295
6,109,837 A *  8/2000 Mausy .......................... 406/117

FOREIGN PATENT DOCUMENTS

| EP | 1 544 133 | A1 | | 6/2005 | | |
|---|---|---|---|---|---|---|
| FI | 20075950 | | | 6/2009 | | |
| FI | 20085141 | | | 6/2009 | | |
| FI | 20096026 | | | 4/2011 | | |
| GB | 1393344 | A | * | 5/1975 | | |
| JP | 51-106361 | A | | 9/1976 | | |
| WO | WO 01/05683 | A1 | | 1/2001 | | |
| WO | WO 2009053528 | A1 | * | 4/2009 | ............. | B65G 53/24 |
| WO | WO 2009068729 | A1 | * | 6/2009 | ............... | B65F 5/00 |
| WO | WO 2009/080881 | A1 | | 7/2009 | | |
| WO | WO 2009/080888 | A1 | | 7/2009 | | |
| WO | WO 2009080880 | A1 | * | 7/2009 | ............. | B65G 53/24 |
| WO | WO 2009080882 | A1 | * | 7/2009 | ............. | B65G 53/24 |
| WO | WO 2009080885 | A1 | * | 7/2009 | ............. | B65G 53/24 |
| WO | WO 2009080886 | A1 | * | 7/2009 | ............... | B65F 5/00 |
| WO | WO 2010/071397 | A1 | | 6/2010 | | |

* cited by examiner

Option 1

Option 2

METHOD AND PNEUMATIC MATERIAL CONVEYING SYSTEM

BACKGROUND OF THE INVENTION

The present invention is directed to a method and system for pneumatically conveying material, e.g., waste material.

The invention relates generally to pneumatic material conveying systems, such as to partial-vacuum conveying systems, more particularly to the collection and conveying of wastes, such as to the conveying of household wastes.

Systems wherein wastes are conveyed in piping by means of suction are known in the art. In these, wastes are conveyed long distances in the piping by sucking. The apparatuses are used for, among other things, the conveying of wastes in different institutions or for the conveying of household waste in urban areas. It is typical to these systems that a partial-vacuum apparatus is used to achieve a pressure difference, in which apparatus a partial vacuum is achieved in the conveying pipe with partial-vacuum generators, such as with vacuum pumps or with an ejector apparatus. A conveying pipe typically comprises at least one valve means, by opening and closing which the replacement air coming into the conveying pipe is regulated. In partial-vacuum conveying systems there are typically the following problems, among others: high energy consumption, high air flow in the piping, problems with noise, and dust and fine particle problems in the outlet pipe. In addition, especially with large distances, in which the lengths of a conveying pipe can be several thousands of meters, the pressure loss increases, in which case in order to ensure satisfactory operation of the conveying system very large pipe diameters and correspondingly efficient pump devices, i.e. fans are needed. This results in very expensive solutions in terms of costs, and also as the pipe size increases more space is required for the installations.

It has been possible to considerably improve prior-art solutions by producing a system, in which at least a part of the conveying piping can be connected as a part of a circuit, in which conveying air is circulated, at least during conveyance of the material, with a pump device, the suction side of which is connected to at least one separating device and further to a conveying pipe, on its return side, so that at least a part of the conveying air on the pressure side of the pump is led into the circuit on the output side of the conveying pipe. This type of solution is presented in e.g. patent publication FI 20085141 and in the corresponding patent publication WO2009/080881.

The aim of the present invention is to further develop the aforementioned systems and to achieve a totally novel solution in connection with the conveying systems of a material, by means of which solution the drawbacks of prior-art solutions will be avoided. Another aim of the invention is to achieve a solution applicable to partial-vacuum conveying systems that is suited to large systems. Yet another aim is to achieve a solution, by means of which the volume of outlet air of the system and, at the same time, emissions of dust and fine particles and possible odor nuisances can be decreased.

The solution according to the invention has a number of important advantages. By using the system in waste material conveying in two phases, of which in the first phase the input points are emptied and their waste material is transferred from a branch pipe into a main conveying pipe and in the second phase the wastes are transferred from the main conveying pipe into a separating means, in which case the main conveying pipe is used as an intermediate reservoir. In the solution according to the invention a pump unit can thus, in a way, be split into two such that two branch conveying pipes can be sucked at the same time. Suction occurs from the branch pipes, which are generally smaller in diameter than the main conveying pipe. The output of smaller pump units is sufficient to transfer waste at least up to the main conveying pipe. It is possible therefore to transfer with low power at least a part of the conveying distance from an input point to the main conveying pipe, which can be used as a reservoir. When a sufficient amount of waste has been transferred from the input points via the branch pipes into the main conveying pipe, the whole output of the pump devices can be connected, if necessary, to suck from a part of the main conveying piping, in which case up to twice the speed is obtained and the waste transfers to a waste station, into a separating means. Next the transfer can be connected to a second section of the main conveying pipe, in which case the main conveying piping empties. With this arrangement the output power of the fans can be up to halved. By connecting at least a part of the conveying piping to comprise a circuit, i.e. into a so-called ring-line piping, in the arrangement the piping can be effectively rinsed and dried. In this case also the blowing of a pump device is directed into the piping. By arranging in a first phase suction/partial vacuum in the main conveying pipe or in a section of the main conveying pipe from two different directions, at least in the proximity of the intersection of the branch conveying pipe intended to be emptied and the main conveying pipe, an effective transfer of waste material from a branch conveying pipe into the main conveying pipe is achieved. At the same time the pressure loss with respect to the main conveying pipe halves. Furthermore, the diameter of the main conveying pipe can be reduced. In the second phase conveying air can be circulated in the circuit formed partly by the conveying piping and an effective transfer of the waste material already transferred to the section of the main conveying pipe to a separating means of a waste station can be achieved. The direction of the conveying air circulation can be changed in the circuit, in which case the most suitable transport route, e.g. in terms of transport distance or energy use, can be optimized.

The invention enables the use of smaller pipe diameters of the conveying piping in pipe sections, which are connected at their second end to the conveying piping that forms a circuit but in which sections conveying air is not circulated, i.e. to a so-called "Single Line" section. According to one embodiment of the invention, the diameter of the main conveying pipe can also be reduced compared to conventional pipe transport systems. Considerable savings are gained by means of the embodiments, because the conveying piping is smaller in diameter and the conveying air volume needed for conveying material is smaller.

According to the invention a part of the piping can be connected into a circuit, in which case conveying air can be circulated e.g. for air-flushing of the piping or for removing humidity. An effective conveying effect can also be achieved in the different parts of the conveying piping and also a fast transfer from the input pipe into the conveying pipe. By arranging the piping of the system to comprise a circuit where at least a part of the conveying air circulates, the volume of outlet air can be decreased. At the same time the energy consumption of the system decreases. By maintaining a partial vacuum and at the same time maintaining blowing, an effective circulation of conveying air in the circuit and conveying of material in the conveying pipe can be achieved. With the solution according to the invention a conventional so-called "Single Line" system that comprises one conveying pipe can be efficiently combined with a solution in which at least a part of the conveying piping forms a circuit in which conveying air can be circulated, i.e. a Ring Line system. At the same time total energy consumption can be made more efficient when at least a part of the transport distance is performed in the conveying piping in which conveying air is circulated. This is a significant advantage, particularly in large waste-conveying systems that cover e.g. a whole city district or city.

When the Single Line and the Ring Line systems are connected, the Single Line pipe section can be selected to be smaller and the diameter of the Ring Line pipe section, i.e. the pipe section in which conveying air can be circulated in the circuit, to be larger, if necessary. In this case some of the air volume is sufficient to transfer wastes in the Single Line part of the piping into the Ring Line pipe section, i.e. into the pipe section that forms a circuit, in which conveying air can be circulated. The total power requirement decreases, in which case a considerable saving is achieved. Typically the saving is in the range of 30-50%. With the solution according to the invention, it is possible to essentially reduce the volume of outlet air and, at the same time, to reduce possible dust problems and fine particle problems in the outlet pipe. Furthermore, the odor nuisances of conveying pipings typical to conventional pneumatic conveying systems of wastes can be reduced. According to the invention at least a part of the conveying piping can be connected as a part of a circuit in which the suction effect to be achieved with the pump devices can be adjusted and/or controlled and/or opened or closed with closing means/adjustment means, such as with valve means, which are arranged in connection with the conveying piping. In this case suction can be efficiently circulated in the system even if the conveying piping of the system would not be a complete ring. At the same time efficient conveying of material can be achieved in the piping. With the method and apparatus according to the invention it is possible to efficiently adjust the relationship of the air to be blown into the conveying piping and the air to be blown out of the system. With the solution according to the invention, the noise problem caused by prior art can also be essentially reduced. Moisture accumulating in the piping decreases and the piping can be dried by circulating air in the piping. When the air to be sucked in decreases, the use of energy also decreases. By opening and closing the input points of the system according to the invention, efficient conveying of material into the conveying pipe and conveying in the conveying pipe are achieved, while at the same time it is possible to keep the noise impact caused by the operation of the system small. By arranging the conveying pipe of the material conveying system to be composed of operating areas, i.e. subcircuits, the conveying of material in the conveying piping and the emptying of input points into the conveying pipe can be effectively arranged. By arranging the conveying air circulation in the opposite direction an effective removal of clogging can be achieved. The change of the conveying air circulation into the other direction can be arranged easily in a ring piping. Also the total energy consumption decreases because, among other things, additional energy for drying the piping, heating the piping, etc., is not needed.

BRIEF DESCRIPTION OF THE FIGURES

In the following, the invention will be described in more detail by the aid of an example with reference to the attached drawing, wherein.

DETAILED DESCRIPTION OF THE INVENTION

Figure 1:
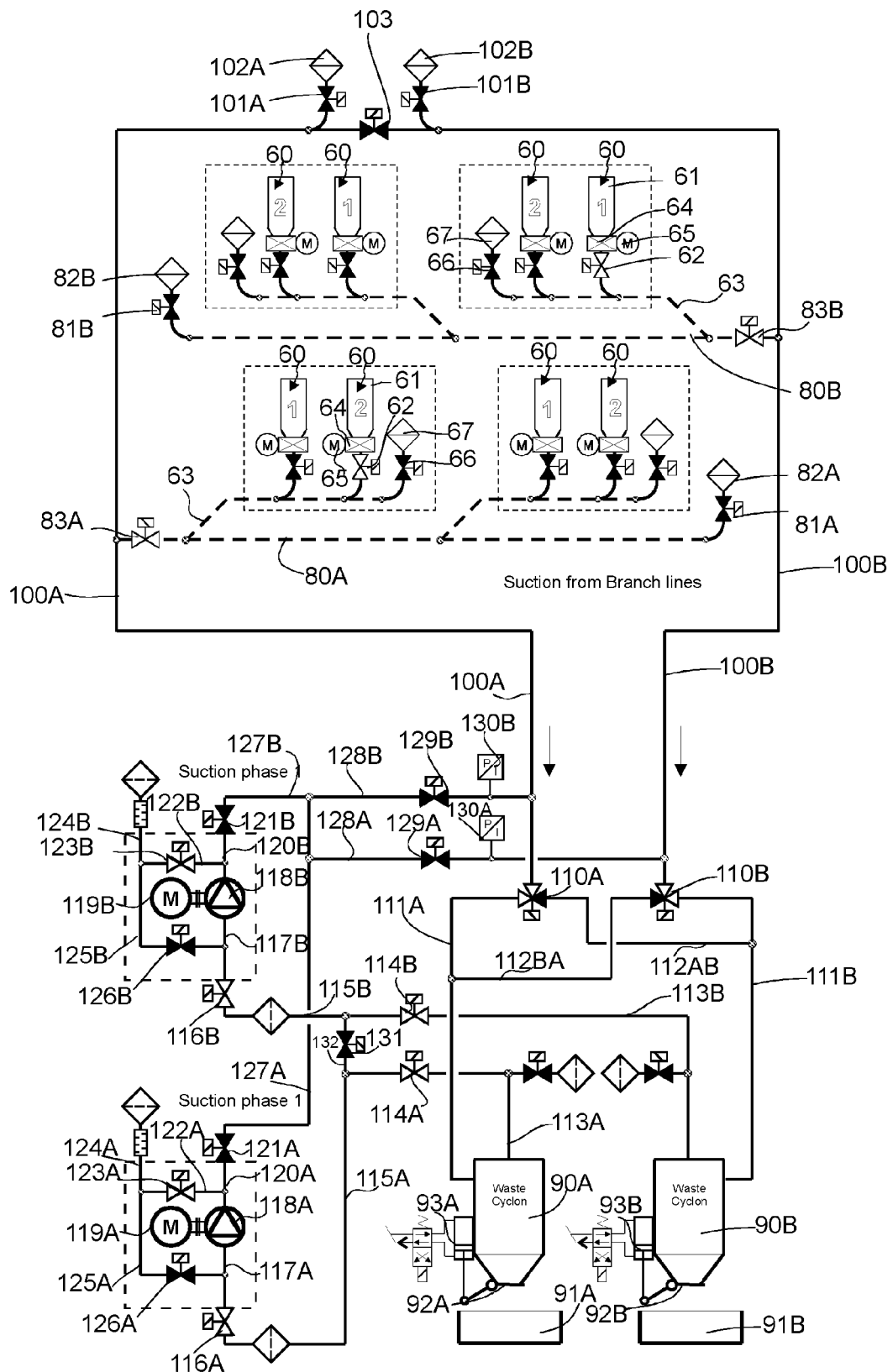
FIG. 1 presents one system according to an embodiment of the invention as a diagram, in one first operating phase.

FIGS. 1-4 present a simplified diagram of a pneumatic material conveying system, more particularly a wastes conveying system, according to one embodiment according to the invention. The figure presents a main conveying pipe 100A, 100B for material, along the side of which main conveying pipe at least one, typically many, branch conveying pipes 80A, 80B are arranged. The embodiment of the figures comprises two branch conveying pipes 80A, 80B. Input points 60 of waste material are arranged along the side of the branch conveying pipes. The input point 60 is a feed-in station of material, more particularly of waste material, intended to be conveyed, from which station the material, more particularly waste material, such as household waste, intended to be conveyed is fed into the conveying system. The system can comprise a number of feed-in stations 60, from which the material intended to be transported is fed into the conveying piping. In the figures the components of an input point are described with reference numbers in connection with two input points 60. The input point 60 typically comprises a feed-in container 61, which can be connected to an input pipe 63. The input pipe comprises at least one valve means 62, by opening and closing which material can be transferred from the input point into the conveying pipe. The input pipe 63 is connected to a branch conveying pipe 80A, 80B, and onwards to the main conveying pipe 100A, 100B, which can thus be formed from a number of pipe sections. The input pipe 63 can comprise a number of input points 60, which are connected to a branch conveying pipe via one input pipe. In the embodiment of the figure a replacement air coupling is arranged at the opposite end from the branch conveying pipe or the main conveying pipe in the conveying direction of the material of an input pipe 63, which replacement air coupling is provided with a filtering means 67 and with a valve means 66, by means of which the access of the replacement air into the input pipe 63 can be adjusted.

The replacement air needed in emptying the feed-in container 61 of an input point 60 comes, in the embodiment of FIG. 1, via the feed-in container 61. According to a second embodiment, a separate replacement air branch coupling, which can be provided with a filtering means, can additionally be in connection with an input point. In the embodiment of the figures a material shaper 64, which is driven with a drive device 65, is also in connection with an input point. By means of the material shaper the waste material can be compacted or otherwise shaped to be better suited into the input pipe. An input point can also be without a shaper of the material. In the embodiment of the figure the number 1 or 2 is marked in the feed-in container 61 of the input points 60, to describe the emptying sequence of the input points of the input pipe 63, when it is intended to empty the feed-in containers 61 of the same input pipe consecutively. The basic principle is that first the feed-in container that is closer to the separating means 90A, 90B in the conveying direction of the material is emptied, and subsequently the feed-in container that is next closest against the conveying direction. A corresponding emptying sequence is applied also with respect to the input pipes of a branch conveying pipe, in which case first the feed-in containers of the input pipe that is closer in the conveying direction of the material in the branch conveying pipe 80A, 80B are emptied, and subsequently the feed-in containers of the input pipe that is next closest against the conveying direction of the material.

The material fed into the conveying pipe 63 from an input point 60 is conveyed along the branch conveying pipe 80A, 80B into the main conveying pipe.

FIG. 1 presents a situation in which the second input point 60 is emptied from the input pipe 63 of the first branch conveying pipe 80A, which input pipe is closest to the separating means 90A in the conveying direction of the material, the valve means 62 of which input point, said valve means being between the feed-in container 61 and the input pipe 63, is in the open position. The valve means 83A between the first branch conveying pipe 80A and the main conveying pipe is in the open position, in which case the partial vacuum achieved by the pump device 118A, which partial vacuum acts on the suction side of the pump device through the piping 117A, 115A, 113A via the separating means 90A in the conveying piping 111A, 100A, causes the waste material to transfer under the effect of the pressure difference from the feed-in container 61 via the input pipe 63 into the branch conveying pipe 80A and onwards into the main conveying pipe 100A.

At the same time the first input point 60 can be emptied from the input pipe 63 of the second branch conveying pipe 80B, which input pipe is closest to the separating means 90B in the conveying direction of the material, the valve means 62 of which input point, said valve means being between the feed-in container 61 and the input pipe 63, is in the open position. The valve means 83B between the second branch conveying pipe 80B and the section 100B of the main conveying pipe is in the open position, in which case the partial vacuum achieved by the second pump device 118B, which partial vacuum acts on the suction side of the pump device through the piping 117B, 115B, 113B via the separating means 90B in the conveying piping 111B, 100B, causes the waste material to transfer under the effect of the pressure difference from the feed-in container 61 via the input pipe 63 into the branch conveying pipe 80B and onwards into the main conveying pipe 100B.

In the embodiment of FIG. 1 the sections 100A, 100B of the main conveying piping can form a circuit, between which sections is a valve means 103. In the situation of FIG. 1, the valve means 103 between the first section 100A of the main conveying pipe and the second section 100B of the main conveying pipe is in the closed position.

In the situation of FIG. 1 the feed-in containers of the input points 60 are emptied via a branch conveying pipe into the main conveying pipe until the desired input points have been emptied. In the system of the invention the valve of the next input point to be emptied is opened to some extent before the valve means of the preceding input point that has just been emptied is closed. In this case a reducing effect on the noise caused by the emptying is possible and thus a possibly detrimental noise effect can be reduced.

Only two branch conveying pipes 80A, 80B are presented in the figure, but the number of them depends on the size of the system. There can thus be considerably more branch conveying pipes, and the number of input points 60 and input pipes 63 in them can vary according to the need of the site.

The diameter of the input pipes and the diameter of the branch conveying pipes are preferably smaller than the diameter of the main conveying piping.

Figure 2:
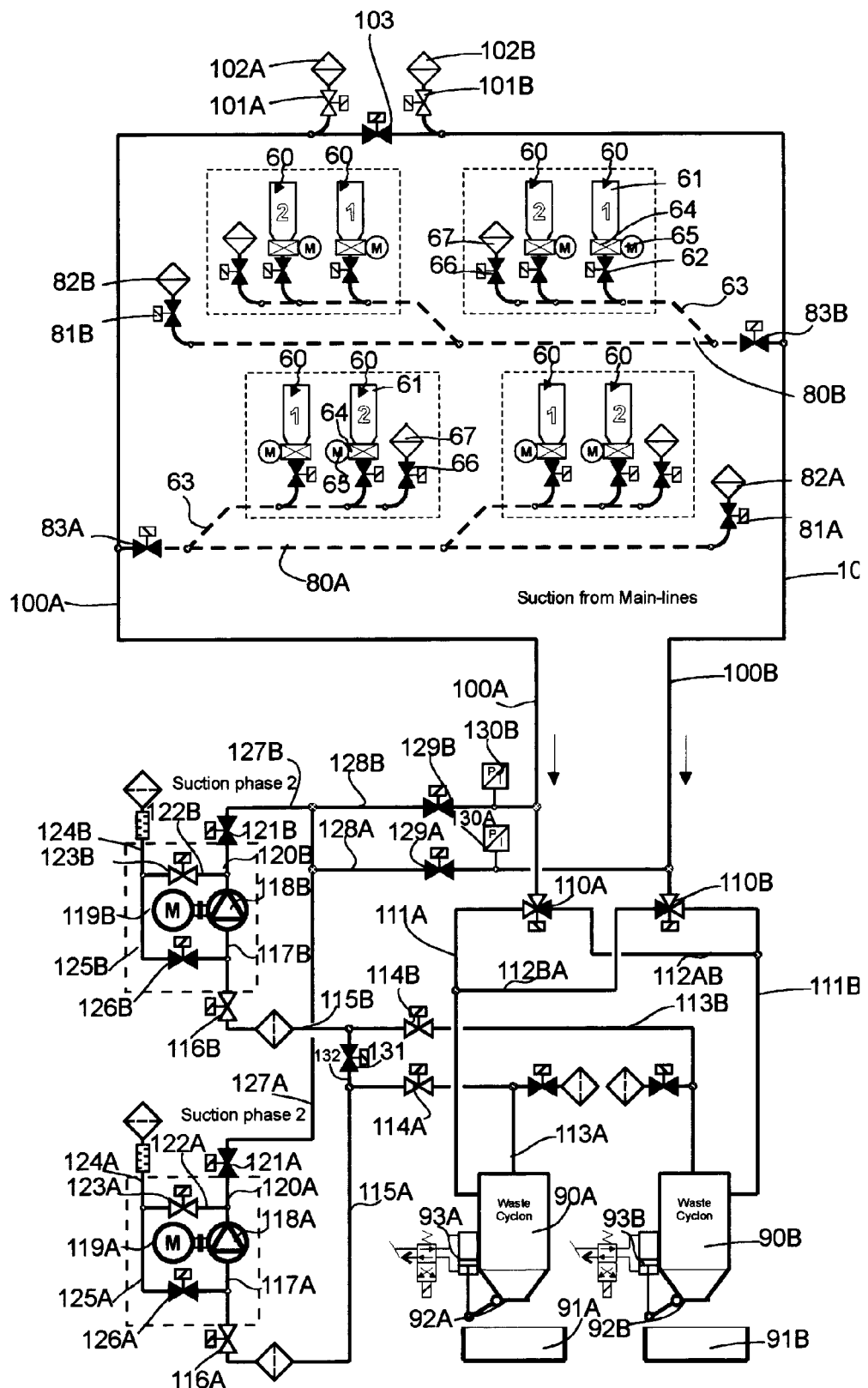
FIG. 2 presents one system according to an embodiment of the invention as a diagram, in one second operating phase.

FIG. 2 presents an alternative, in which the wastes transferred into the sections 100A, 100B of the main conveying pipe are transferred onwards along the sections of the main conveying pipe to the separating means 90A, 90B, in which the waste material is separated from the conveying air. In the embodiment of FIG. 2 the wastes of two different pipe sections 100A, 100B of the main conveying pipe are emptied simultaneously into different separating means 90A, 90B using the own partial-vacuum generating apparatus of both pipe sections and at least one pump means 118A, 118B of said apparatus for achieving a conveying effect. The suction side of at least one pump means 118A of the first partial-vacuum generating apparatus is connected via piping 117A, 115A, 113A to the first separating means 90A, which is connected to the first section 100A of the conveying piping via the pipelines 111A. Correspondingly, the suction side of at least one pump means 118B of the second partial-vacuum generating unit is connected via piping 117B, 115B, 113B to the second separating means 90B, which is connected to the second section 100B of the conveying piping via the pipelines 111B. In the embodiment of FIG. 2 replacement air couplings are arranged for the sections 100A, 100B of the conveying piping, which replacement air couplings are provided with a filtering means 102A, 102B and with valve means 101A, 101B. The replacement air couplings are on opposite sides of the closed valve means 103 dividing the main conveying piping into different sections. The valve means 101A, 101B of the replacement air couplings are open (white in the figure) and correspondingly the valve means 83A, 83B of the branch conveying pipes are closed (black in the figure), in which case there is an air flow in the sections 100A, 100B of the main conveying pipes from the replacement air couplings towards the separating means 90A, 90B. In the figure, the direction of the conveying air flow is presented with arrows. The speed of the air flow is sufficient for the waste materials, which are transferred from the branch conveying pipes into the main conveying pipes, to transfer in the main conveying pipe in the first section 100A of the main conveying pipe towards the first separating means 90A and in the second section 100B of the main conveying pipe towards the second separating means 90B.

The waste material thus transfers along the conveying piping to one or more separating means 90A, 90B, in which the material to be transferred separates, e.g. due to the dropping of speed and centrifugal force, from the conveying air. The separated material is removed, e.g. according to need, from the separating means 90A, 90B, into a material container 91A, 91B, such as into a waste container, or to further treatment. Emptying means 92A, 93A; 92B, 93B are in connection with the separating means 90A, 90B. The material container can comprise a waste compactor (not shown), with which the material is compacted by compressing into smaller size and from which compactor the material is further conveyed into the waste container.

In the embodiment of FIG. 1, two separating means 90A, 90B are presented, into which material can be transferred in a controlled manner. In the embodiment of FIG. 1 the wastes of both sections of the main conveying pipes were directed to different separating means 90A, 90B by using own partial-vacuum generators for the transfer of both. This enables fast simultaneous operation.

On the other hand, a number of partial-vacuum generators and the output power of them can be used to transfer the wastes of one conveying pipe section at a time into a separating means. The type of situation is presented in FIG. 3 in which the suction side of the pump device 118A of the first partial-vacuum unit is connected along piping 117A, 115A, 132, 115B, 113B to the second separating means 90B and correspondingly the suction side of at least one pump device 118B of the second partial-vacuum generating apparatus is connected via piping 117B, 115B, 113B to the second separating means 90B. The connection from the suction side of the pump devices 118A, 118B to the first separating means 90A is closed with the valve 114A. The second separating means is further connected via the conveying piping 111B and the valve means 110B to the second conveying pipe section 100B. In this case the output power of the pump devices 118A, 118B of both partial-vacuum generator units of the figure is connected for transferring the waste material of the second conveying piping into the second separating means 90B. Replacement air is obtained when the valve 101B of the replacement air coupling is in the open position. When the second conveying pipe section 100B has been emptied of wastes, in the next phase the pump devices 118A, 118B of both partial-vacuum generating devices can be connected for emptying the first conveying pipe section into the separating means.

If it is desired that waste materials are transferred to the previous second separating means 90B, it is only necessary to close the connection of the three-way valve 110B to the second conveying pipe section and to open the connection via the first three-way valve 110A from the first conveying pipe section 100A along the pipe 112AB to the pipe 111B and onwards to the second separating means 90B. In this case the connection enabled by the first three-way valve 110A via the pipe 111A to the first separating means 90A is closed.

If, alternatively, it is desired that the waste material of the first conveying pipe section is transferred to the first separating means 90A by using the partial vacuum/suction power achieved by the pump devices 118A, 118B of both partial-vacuum generating units, the connection from the suction side of the pump devices to the first separating means is opened by opening the valve 114A and the connection from the suction side to the second separating means 90B is closed by closing the valve 114B. In this case the valve 131, in the pipe 132 between the pipes 115A, 115B, is open. In this case when the first three-way valve 110A is in the position of FIG. 3, the waste material of the first conveying pipe section 100A starts to transfer towards the first separating means 90A, in which the waste material is separated from the conveying air.

In the system according to the figures when e.g. the first separating means 90A fills, the material to be transferred can be guided to a second separating means 90B. In the embodiment of the figures both separating means 90A, 90B are provided with material removing means 92A, 93A; 92B, 93B. The material removing means comprise e.g. a closing means 92A, 92B of the output aperture and the drive means 93A, 93B of it. A conveying air duct 113A, 115A, 117A; 113B, 115B, 117B leads from the separating device 90A, 90B onwards to the means 118A, 119A; 118B, 119B for forming a partial vacuum in the conveying pipe.

In the embodiment of FIGS. 1-5, the means for forming a partial vacuum comprise a number of pump units. By means of them the partial vacuum needed in conveying material is produced in the conveying piping and/or in a part of it. Each of the pump units comprises a pump device 118A, 118B, which is driven with a drive device 119A, 119B. The suction side of the pump devices can be connected via the separating means 90A, 90B to the conveying piping 100A, 100B. The blowing side of the pump devices 118A, 118B, for its part, can be connected in the embodiment of the figure to blow into the conveying piping 100A, 110B via the line 127A, 128A; 127B, 128B and/or into the outlet line 124A, 124B. The diagram according to the figures presents two pump units. There can also be a number of pump units, according to the embodiment of the system.

The blowing side of the pump device 118A of the first pump unit has two lines, a line 127A leading to the conveying piping 100A or to the conveying piping 100B and an outlet line 122A, 124A, which is provided with a valve means 123A. In the embodiment of the figure, the outlet line 124A is provided with a filtering means. The blowing produced by the pump device 118A of the pump unit can be controlled by opening and closing the valves 121A, 123A and further 129A, 129B. The suction side of the pump device 118A of the pump unit is connected with a suction line 117A to the line 113A or 113B going to the separating device 90A or 90B. The suction line comprises valve means 114A, 114B and further 110A, 110B. The suction line can, if necessary, be connected by opening the valve 126A to the outlet line 124A via the pipe 125A.

At least one pump device 118B of the second pump unit has valve means that mainly correspond to what is described above in connection with the first pump device.

Figure 4:
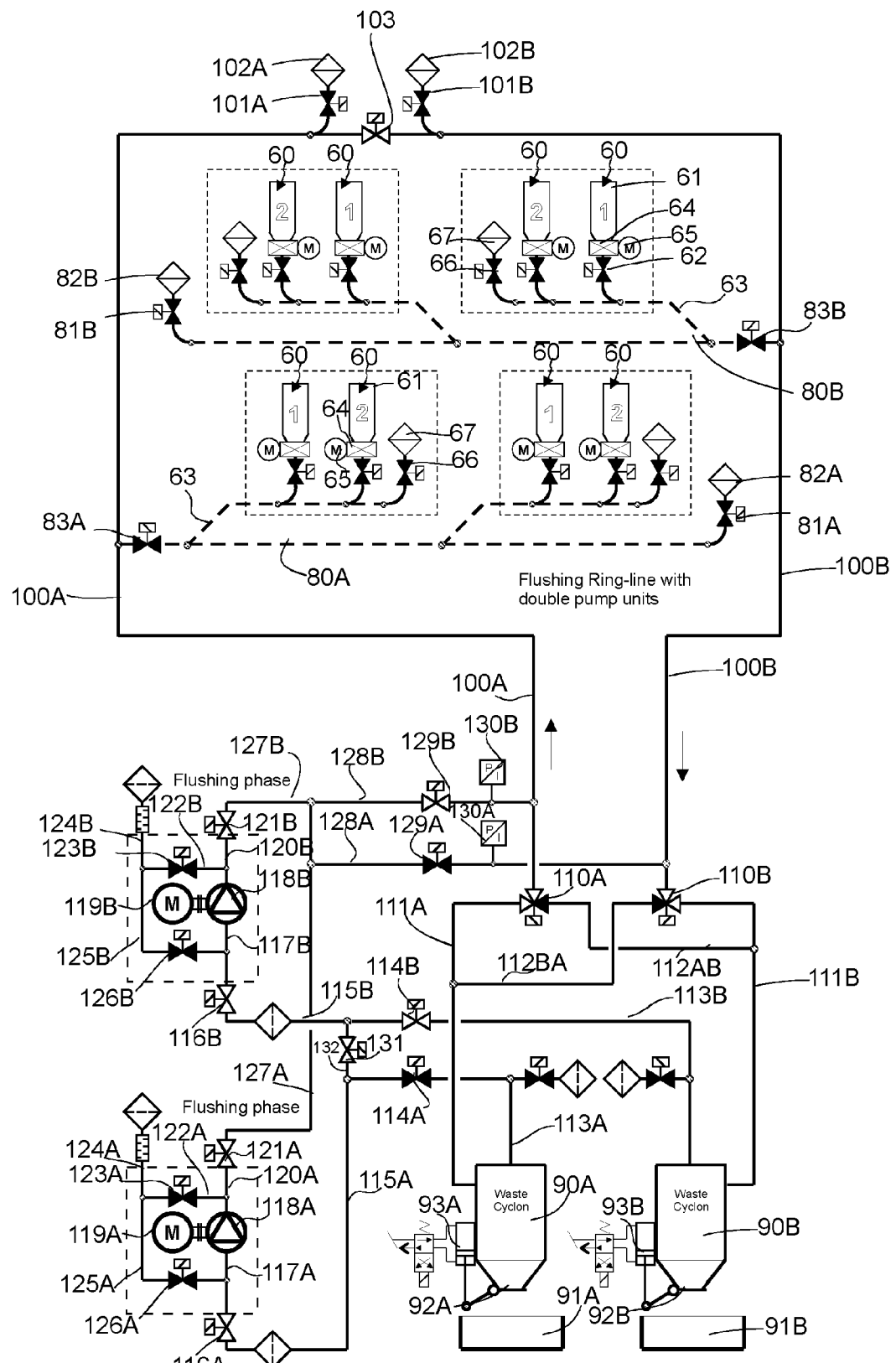
FIG. 4 presents one system according to an embodiment of the invention as a diagram, in one fourth operating phase.

According to FIG. 4 at least a part of the conveying piping can be connected into a circuit, e.g. by opening the valve 103 between the sections 100A, 100B of the main conveying piping. In this case conveying air can be circulated in the conveying piping by connecting the blowing side of at least a second pump device 118A, 118B to the first section 100A of the conveying pipe and by connecting the suction side of at least one of the pump devices 118A, 118B to the second section 100B of the conveying pipe. In FIG. 4 a connection 120A, 121A, 127A, 128B, 129B has been opened from the blowing side of the first pump device 118A to the first section 100A of the conveying pipe. Also from the second pump device, from the blowing side of it, a connection 120B, 121B, 127B, 128B, 129B has been opened to the first section 100A of the conveying pipe.

A connection 117A, 116A, 115A, 131, 132, 114B, 113B has been opened from the suction side of the first pump device 118A via the second separating means 90B via the conveying pipe 111B and the three-way valve 110B to the second section 100B of the main conveying piping. In the embodiment of the figure there is also a connection 117B, 116B, 115B, 114B, 113B from the suction side of the second pump device 118B via the second separating means 90B via the conveying pipe 111B and the three-way valve 110B to the second section 100B of the main conveying piping. In this case conveying air can be circulated in the piping in a circuit, a part of which circuit is formed by the sections 100A and 100B of the main conveying piping.

Of course, the system enables the circulation of conveying air also in the opposite direction, in which case the blowing air is led into the second pipe section 100B and the suction side of a pump device 118A, 118B is connected to the first conveying pipe section 100A.

At least a part of the conveying piping 100A, 100B can be connected as a part of a circuit, in which conveying air can be circulated with a pump device, the suction side of which is connected to at least one separating device and onwards to a conveying pipe on its return side, such that at least a part of the conveying air on the pressure side of the pump device is led into the circuit on the output side of the conveying pipe. Depending on the extent of the system and on the embodiment, at least a part of the conveying piping can be formed as a ring or as a number of rings, in which conveying air circulation can be changed by means of valve means.

According to a second embodiment it is possible that the output power of the pump devices can be adjusted, in which case the suction powers/blowing powers achieved with the different pump devices can vary according to need.

Figure 5:
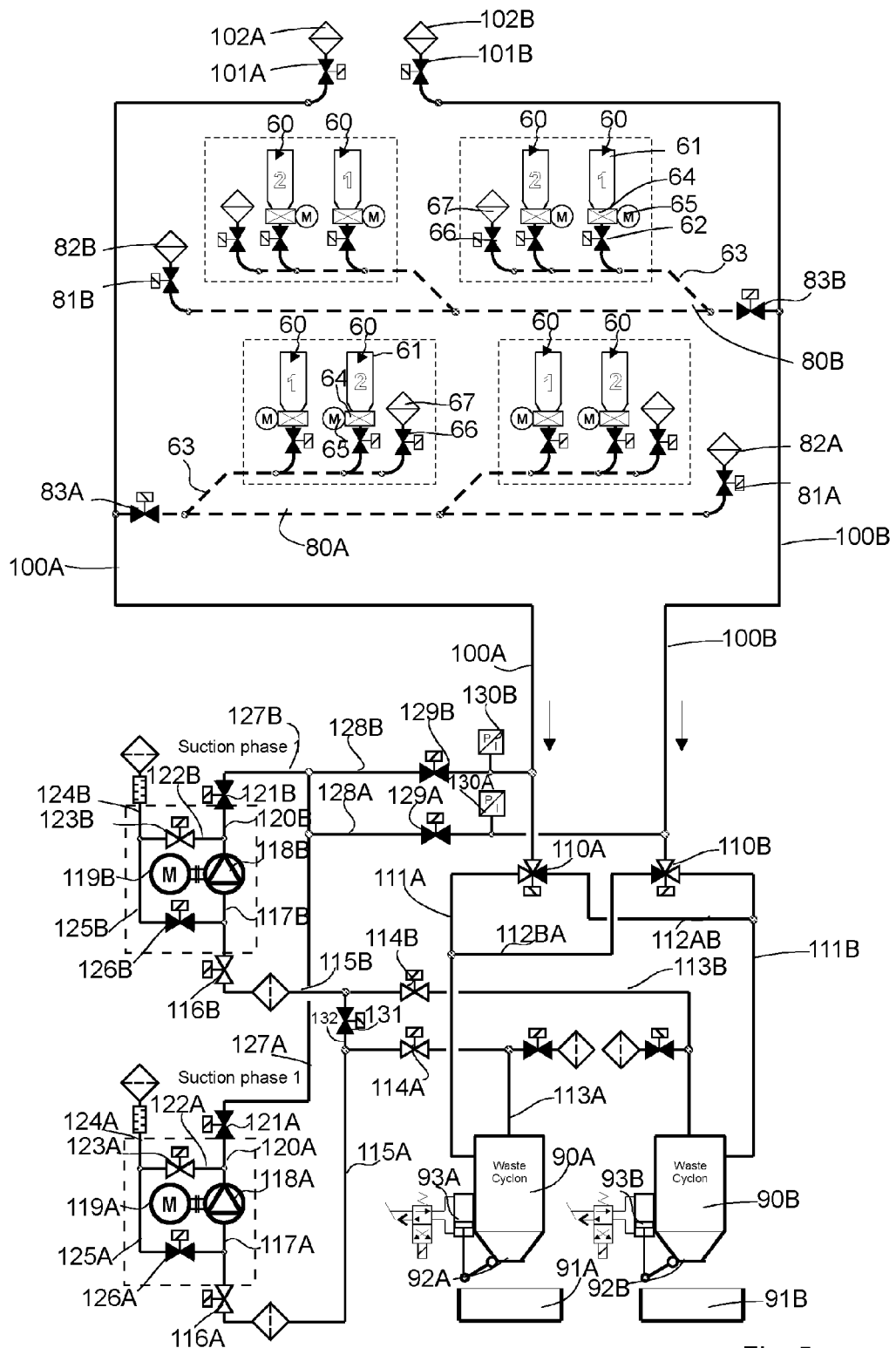
FIG. 5 presents one alternative embodiment of the invention as a diagram.
Figure 6:
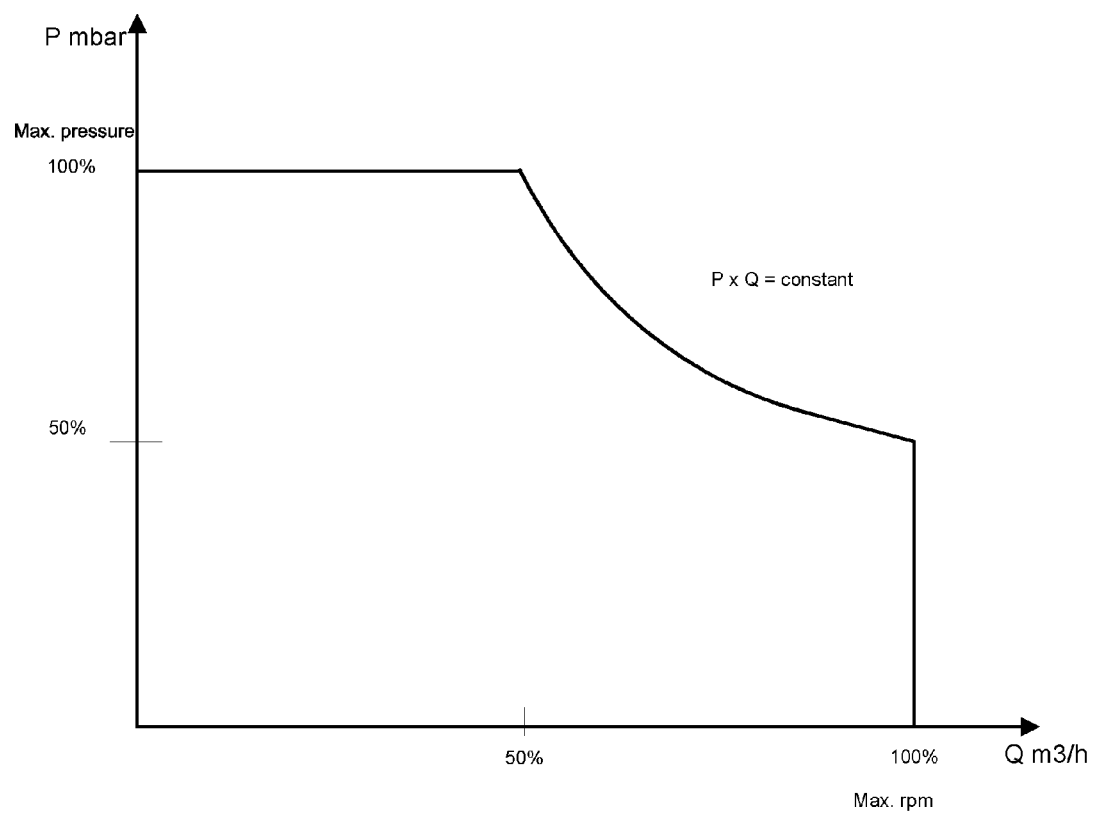
FIG. 6 presents a graph of the output curve of a pump device according to an embodiment according to the invention.

FIG. 6 presents one graph of the control of the system. As presented in the diagrams of FIGS. 1-5, the system is provided with pressure sensors 130A, 130B, by means of which the pressure (partial vacuum) of the piping can be monitored. On the basis of the information given by the pressure sensors 130A, 130B, the operation of one or more pump devices 118A, 118B can be controlled. The control occurs e.g. with a frequency converter, which on the basis of the pressure data of a pressure sensor adjusts the speed of rotation of a pump device such that the pressure times the output is a constant (p×Q=constant, where p=[mbar]; Q=[m3/h]). The frequency converter or the control system calculates on the basis of the pressure data the output power and tries to regulate the speed of rotation of the pump device such that the pressure times the output is a constant. In the method the pressure in the piping is monitored and the partial vacuum and/or output achieved by the pump device(s) is controlled, in which in at least a part of the operating area of the pump device(s) the pressure times the output, i.e. the volume flow rate (p×Q), is constant, in which case the limit values are the maximal pressure achievable and the maximum volume flow rate achievable, which is based on the maximum speed of rotation of the pump(s).

In FIG. 6 it is seen that with low outputs (e.g. 0-50%) maximum pressure is achieved. The second limit value is maximum output, which is already limited by the maximum speed of rotation of the pump device. Between these the operation of the system is optimized in the manner presented, which in the figures is with the limits (approx. 50-100%) for the speed of rotation and with the limits (50-100%) for pressure.

From the operating phases presented above it can be seen that the operation of the system is controlled such that for the emptying of the input points of the desired operating area at least one valve that is in the conveying direction of the material with respect to the operating area of the conveying pipe and that is on the output side, i.e. on the suction side, of the conveying air is open, in which case the suction is able to act in the conveying pipe of the operating area.

Typically the input points 60, or at least a part of them, are emptied such that the connection of the input point that is closest to the delivery end in the travel direction of the conveying pipe, i.e. closest to the separating device 90, 90A, 90B in the embodiment according to the figure, to the conveying pipe is opened first, in which case the material is able to transfer from the first input point into the conveying pipe. After this the connection of the next input point to the conveying pipe is opened, and the connection of the first input point, which is already emptied, to the conveying pipe is closed.

Figure 3:
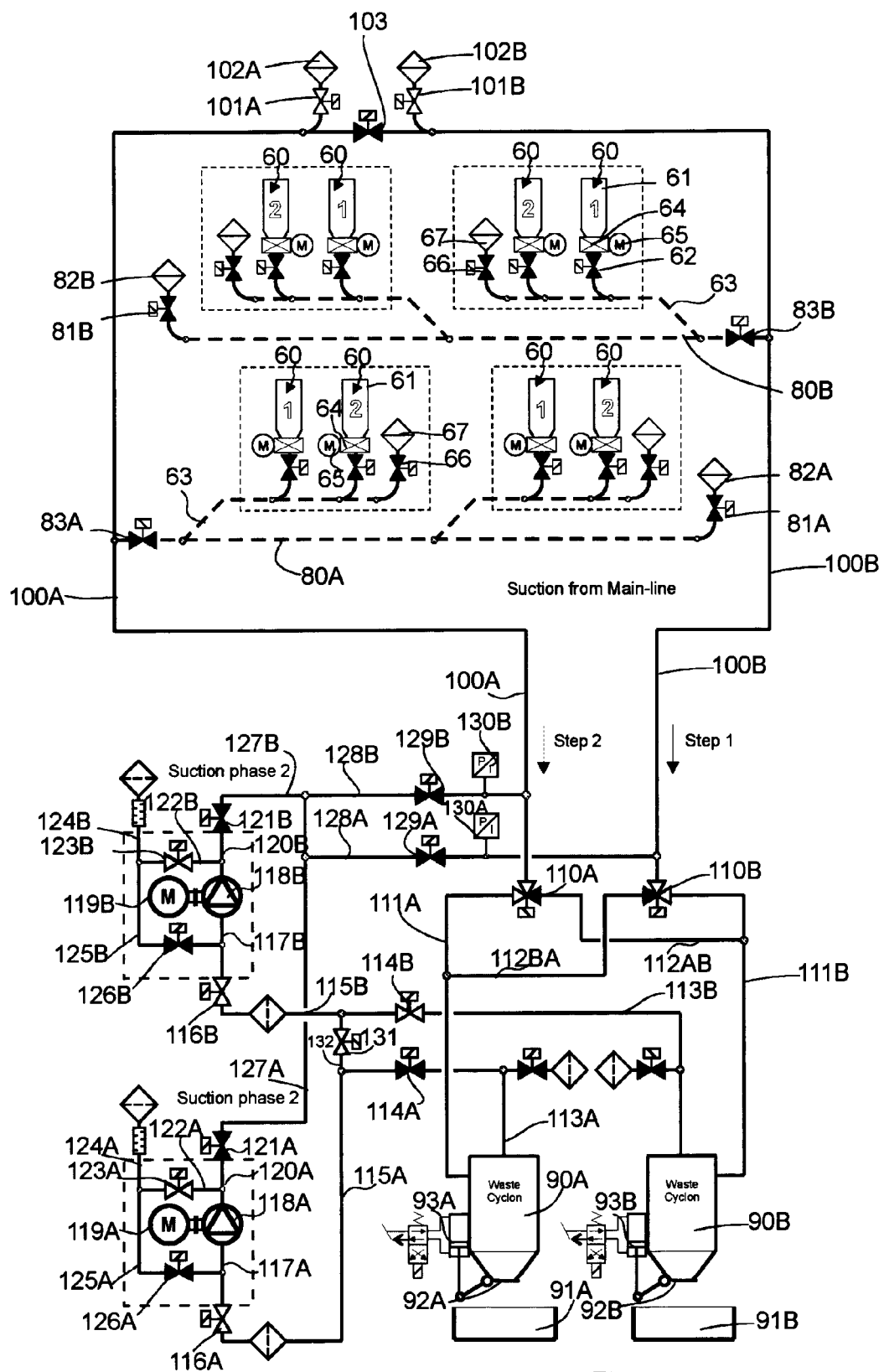
FIG. 3 presents one system according to an embodiment of the invention as a diagram, in one third operating phase.

FIG. 5 presents yet another embodiment of the invention, wherein the main conveying pipe sections 100A and 100B are separate from each other at the opposite end with respect to the separating devices, in which case they operate continuously, like the embodiments of FIGS. 1-3, in which case the valve 103 is closed. In terms of its basic operation, the embodiment of FIG. 5 otherwise corresponds to the embodiments of FIGS. 1-3.

FIGS. 7-10 present as a diagram a system according to one embodiment of the invention. In the system of the figures the main conveying pipe sections 100A, 100B can be connected into a circuit. The embodiment of the figures presents one separating means 90, to which the suction sides of the pump devices 118A, 118B of the partial-vacuum generators can be connected. In the embodiment of the figures the connection from the conveying pipe sections 100A, 100B to the separating means 90 can be adjusted with the valve means 110A, 110B. Whether the connection from the first conveying pipe section 100A to the pipe 111 leading to the separating means 90 is open or closed is adjusted with the first valve means 110A and whether the connection from the second conveying pipe section to the pipe 111 leading to the separating means is open or closed is adjusted with the second valve means 110B. Correspondingly, whether the connection from the blowing side of a pump device 118A, 118B is open to either conveying pipe section 100A, 100B is adjusted with the valve means 129A, 129B.

Figure 7:
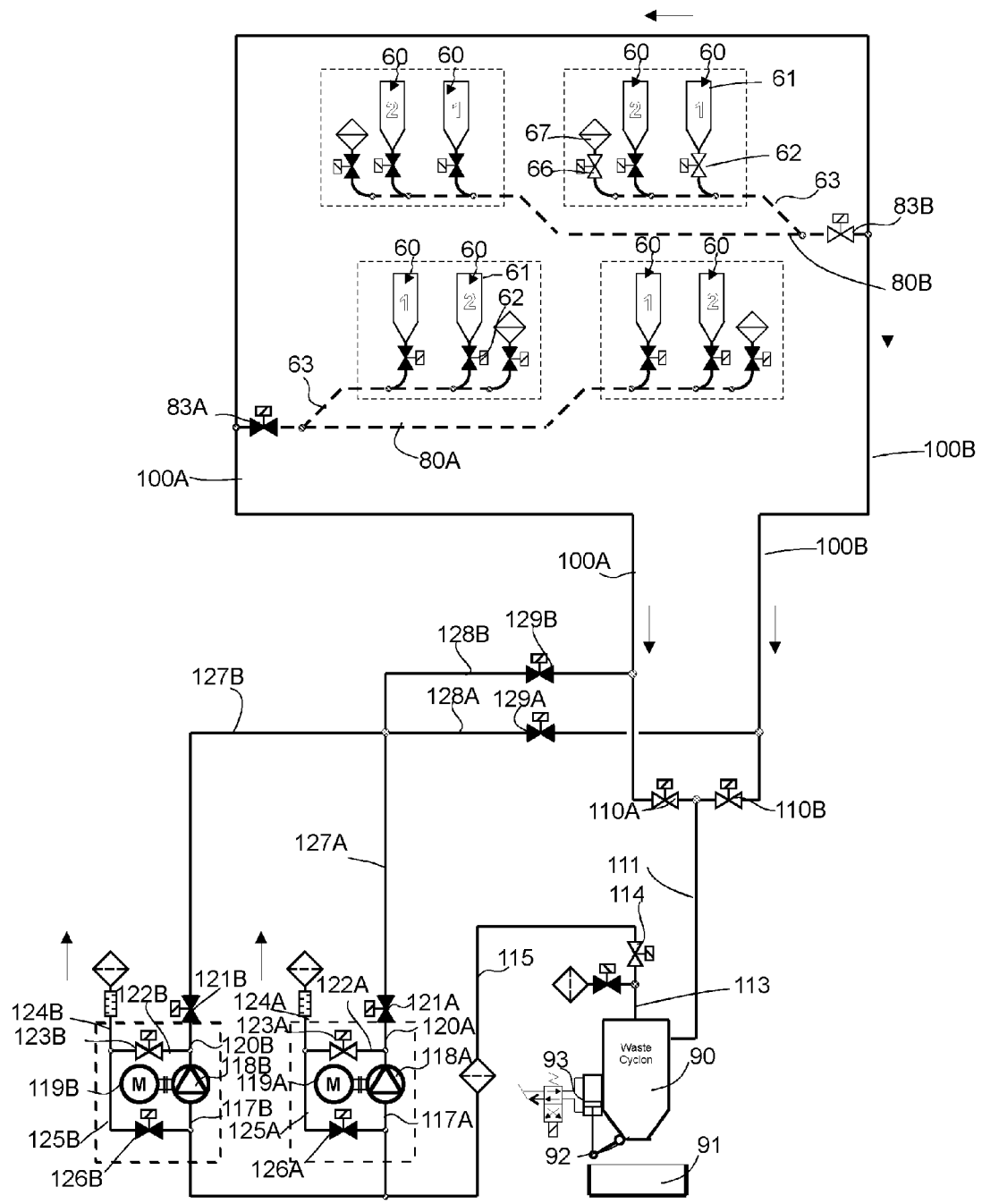
FIG. 7 presents one system according to an embodiment of the invention as a diagram, in one first operating phase.

In the embodiment of FIG. 7 an operating phase is presented in which the wastes of the feed-in container 61 of an input point 60 of the branch conveying pipe 80B are sucked via the branch conveying pipe 80B into the main conveying pipe, into the section 100B of it. In the embodiment of the figure the sections 100A, 100B of the main conveying pipe are both connected at their delivery ends to a pipe 111 leading to the separating means 90, and the partial-vacuum generators, the suction side of the pump devices 118A, 118B of them, are connected to a pathway 117A, 117B, 115, 113 leading to the separating means 90, in which case the suction/partial vacuum produced by the pump devices 118A, 118B of the partial-vacuum generators is able to act in the sections 110A, 110B of the main conveying pipe. The suction/partial vacuum acts in the junction point of the main conveying pipe and the branch conveying pipe 80B in the main conveying pipe from different directions, as is described with arrows in FIG. 7. Replacement air comes into the input pipe 63 and onwards into the branch conveying pipe 83B when the valve 62 of the feed-in container 61 of an input point is open via the feed-in container 61, and when the replacement air valve 66 is open also via it. In this case the wastes are sucked from the branch pipe 80B via two routes, i.e. from two directions in the trunk line, i.e. from the directions of both main conveying pipe sections 100A, 100B. In this case the pressure loss with respect to the trunk line halves. The blowing sides of the partial-vacuum generators, i.e. the pump devices 118A, 118B, are connected to blow into the outward blowing pipe 124A, 124B, in which case the valves 123A, 123B are open and the valves 121A, 121B are closed.

Figure 8:
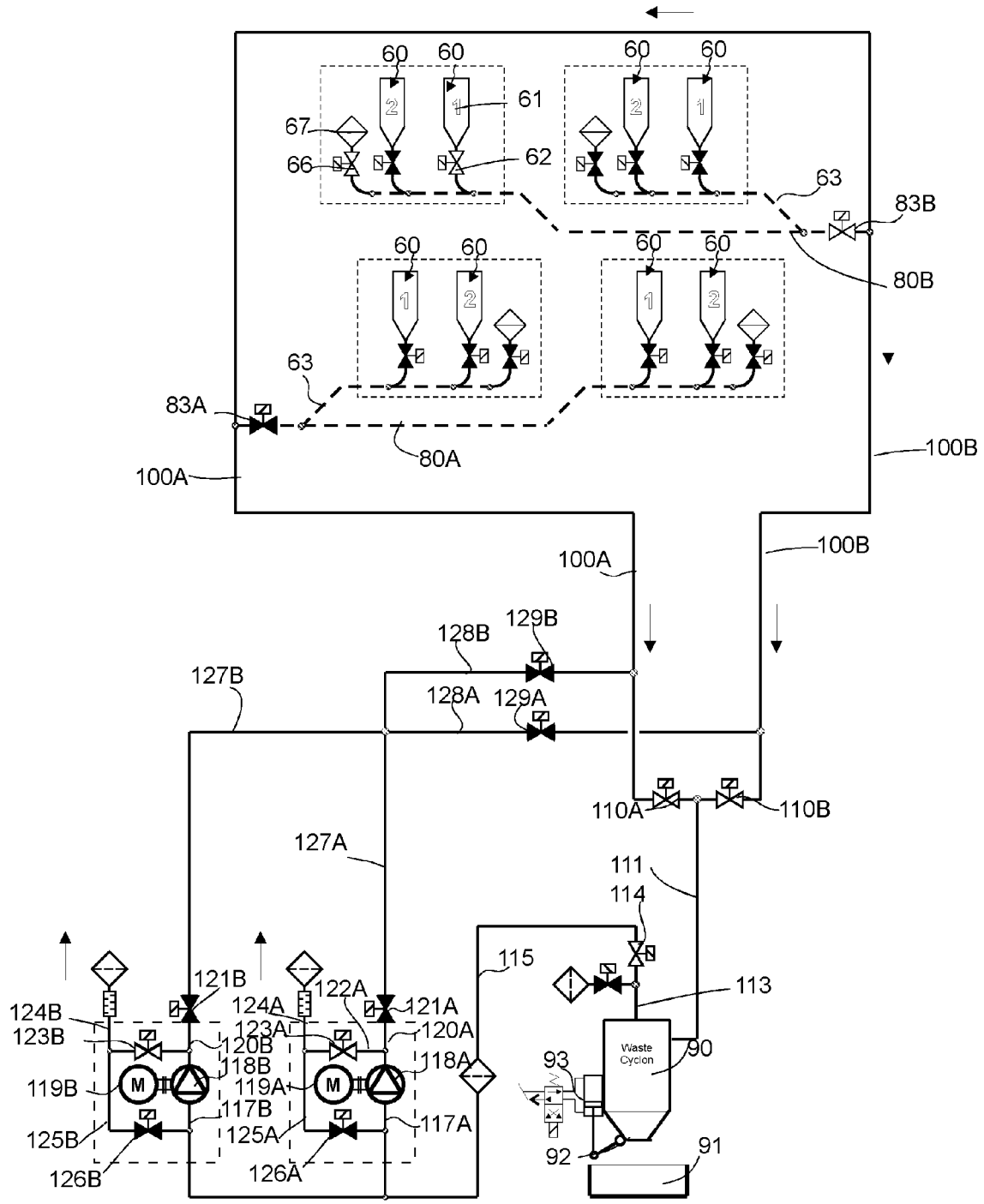
FIG. 8 presents one system according to an embodiment of the invention as a diagram, in one second operating phase.

FIG. 8 presents a corresponding situation, in which one other input point 60 connected to a branch conveying pipe 80B is emptied. The input point is farther from the separating means 90 against the conveying direction of the material than the input point 60 to be emptied of FIG. 7, so that it is emptied later than the input point of FIG. 7.

In the situation of FIGS. 7 and 8 the feed-in containers of the input points 60 are emptied via a branch conveying pipe into the main conveying pipe until the desired input points have been emptied. In the system of the invention the valve of the next input point to be emptied is opened to some extent before the valve means of the preceding input point that has just been emptied is closed. In this case a reducing effect on the noise caused by the emptying is possible and thus a possibly detrimental noise effect can be reduced.

Figure 9:
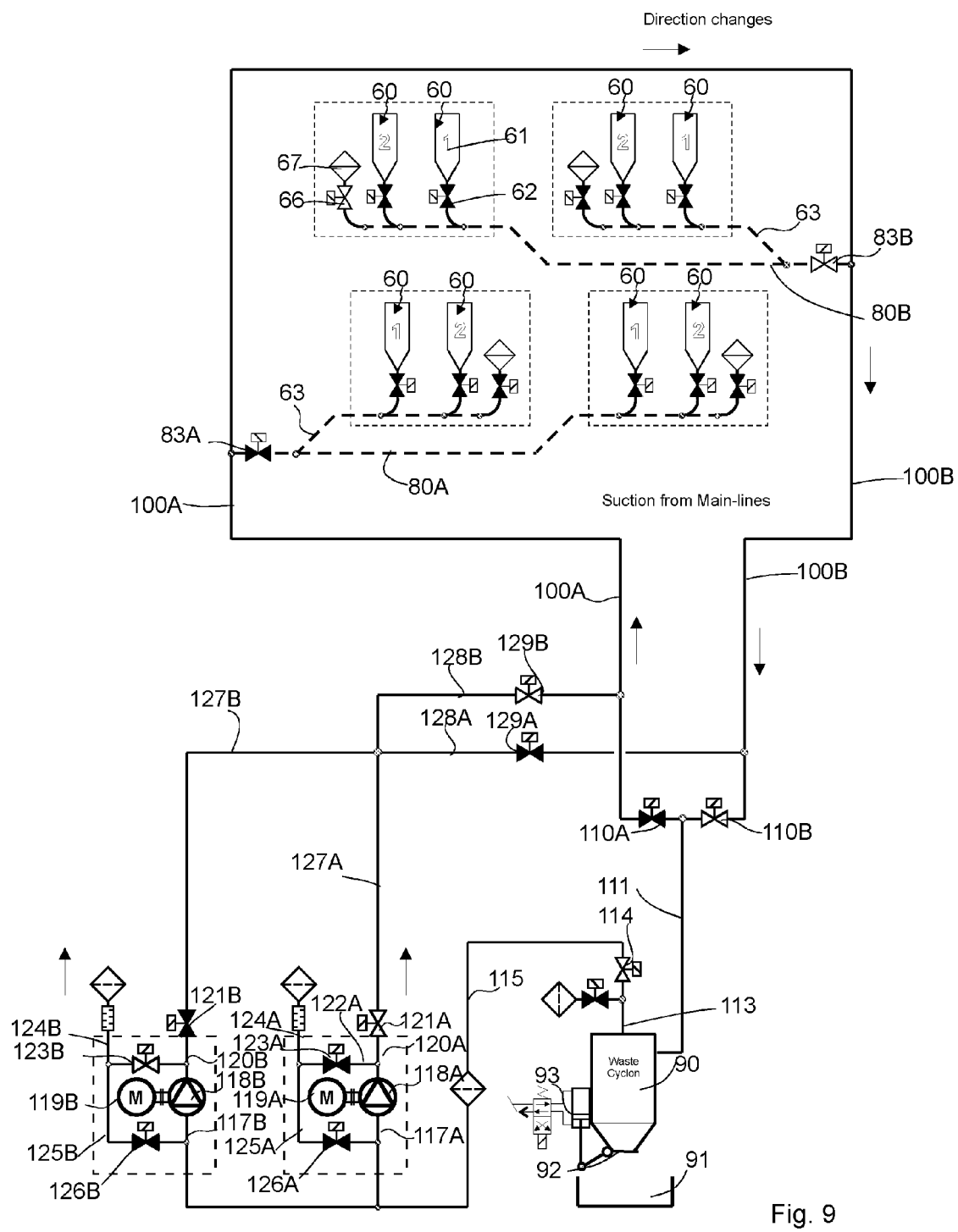
FIG. 9 presents one system according to an embodiment of the invention as a diagram, in one third operating phase.

FIG. 9 presents a situation in which the wastes transferred into the main conveying pipe from the branch conveying pipe are transferred onwards via a section of the main conveying pipe to the separating means 90. In this case the connection of the second main conveying pipe section 100B to the separating means 90 is kept open and the suction sides of the pumps 118A, 118B are kept connected to the separating means 90. On the other hand, the blowing side of the first pump device 118A is now connected by closing the valve 123A leading to the outward blowing pipe and by opening the valve 121A and the second valve 129B to the main conveying pipe section 100A. In this case the main conveying pipe sections 100A, 100B form a part of a circuit, in which conveying air can be circulated. The conveying air circulates such that the wastes transferred from the branch conveying pipe 80B into the main conveying pipe transfer via the section 100B of the main conveying pipe into the separating means 90. The second pump device 118B is connected at its blowing side further to blow into the outward blowing pipe. Replacement air is obtained into the circuit via the replacement air coupling arranged at the opposite end, with respect to the branch conveying pipe or the main conveying pipe in the conveying direction of the material, of an input pipe 63 connecting to the branch conveying pipe 80B. The replacement air coupling is provided with a filtering means 67 and with a valve means 66, by means of which the access of the replacement air into the input pipe 63 and into the branch conveying pipe 80B can be adjusted. The embodiment of the figures has the advantage that the pipe diameters of the branch conveying pipe and of the main conveying pipe can even be corresponding to each other. With regard to the embodiments of FIGS. 1-5, it is possible therefore to further considerably reduce the diameter of the main conveying pipe.

The procedure when emptying the branch conveying pipe 80A is corresponding, but the circulation of the conveying air can be connected to travel in the main conveying pipe in the opposite direction compared to FIG. 9, because the conveying distance from the intersection point of the branch conveying pipe 80A and the main conveying pipe section 100A to the separating means 90 is shorter via the main conveying pipe section 100A and the pipe 111 than by circulating the waste via the second main conveying pipe section 100B. The direction of the conveying air can be changed by closing the connection of the second main conveying pipe section 100B to the separating means 90, the connection leading to the separating means, by closing the valve 110B and by opening the connection of the first main conveying pipe section 100A to the separating means by opening the valve 110A. The connection on the blowing side of at least one of the two pumps 118A, 118B to the first main conveying pipe section 100A is closed by closing the valve 129B and by opening the valve 129A to the second main conveying pipe section 100B.

When the wastes are transferred along a main conveying pipe/main conveying pipe section 100A, 100B to a separating means 90, there are, according to FIG. 9, two inlet pipes of air, i.e. from the blowing side of the pump device along the pipe 128B into the conveying pipe section 100A and also replacement air via the branch pipe 80B, when the valve 66 of the replacement air coupling connected to it is open.

Generally in long conveying distances, in which the branch pipe is e.g. 500 m long and when the main conveying pipe section is e.g. 1000 m, typical diameters of the pipes are 350 mm and 500 mm.

In the embodiment of FIGS. 7-9 a common pipe diameter can be permitted, which pipe diameter is relatively small compared to a conventional one, e.g. in the region of 350 mm, because now two suction pipes and replacement air pipes are acting. Considerable savings are gained by means of the embodiments, because the conveying piping is smaller in diameter and the conveying air volume needed for conveying material is smaller.

Figure 10:
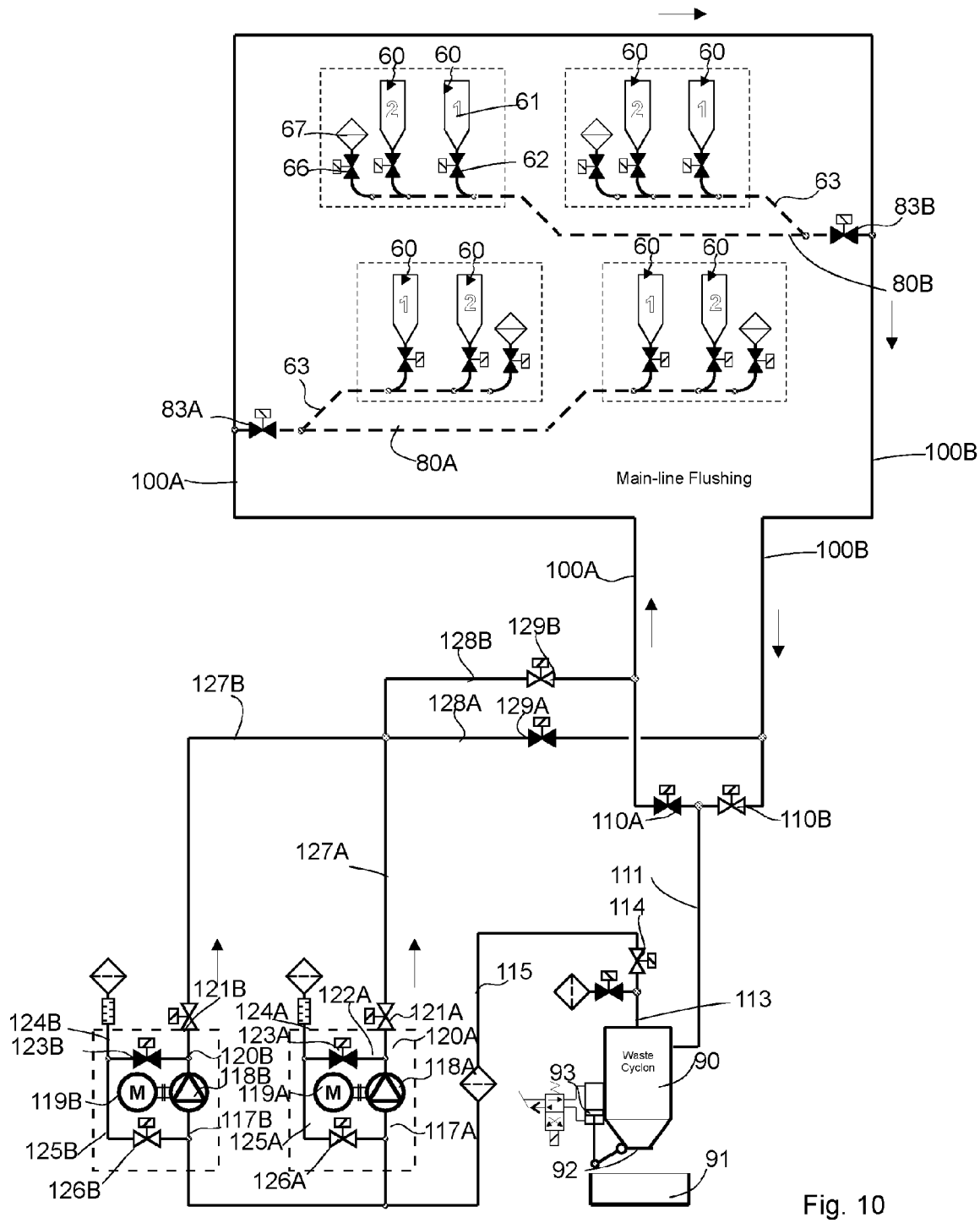
FIG. 10 presents one system according to an embodiment of the invention as a diagram, in one fourth operating phase.

The embodiment of FIG. 10 further presents the air flushing and drying of the piping by circulating air in the circuit, a part of which circuit is formed by at least a part of the conveying piping. In the embodiment of FIG. 10, the blowing sides of the pump devices 118A, 118B of both partial-vacuum generators are connected to blow into a first main conveying pipe section 100A. Correspondingly, the suction sides of the pump devices 118A, 118B of the partial-vacuum generators are connected via a connection 113, 115, 117A, 117B to the separating means 90. The inlet side of the second main conveying pipe section 110B is connected to the separating means when the valve 110B is open. Correspondingly, the valve 110B is closed. In this case with the pump devices air can be circulated in the circuit 100A, 100B, 111, 90, 113, 115, 117A, 117B, 127A, 127B, 128B, a part of which circuit is formed by the main conveying pipe sections, or at least a part of them. There is a connection from the suction side of the pumps to outside the circuit, e.g. to an outward blowing pipe 124A, 124B, from which additional air is obtained, if necessary. It is advantageous to perform flushing of the piping by circulating air in the piping, by blowing, because then the efficiency ratio remains higher. The circulating air comes back to the suction side of the pump devices, but the valves 126A, 126B are open to the outward blowing pipe, from which in this case replacement air is obtained into the circuit, in which case the feed pressure of the pump device is higher.

The invention thus relates to a method in a pneumatic material conveying system, such as a waste conveying system, which conveying system comprises at least one input point 60 of material, more particularly of waste material, a material conveying pipe, which can be connected to the input point 60, and at least one separating device 90, 90A, 90B, in which the material to be conveyed is separated from the conveying air, and also means for achieving a pressure difference and/or a conveying air current in the conveying pipe at least during conveyance of the material, which means for achieving a pressure difference and/or a conveying air current comprise at least one pump unit, which comprises at least one pump device 118A, 118B. In the method the conveying piping comprises at least one main conveying pipe section 100A, 100B and also at least one branch conveying pipe section 80A, 80B, which can be connected to the main conveying pipe section 100A, 100B, and that an input point 60 can be connected to a branch conveying pipe section 80A, 80B, in which method material is transferred initially from an input point 60 via a branch conveying pipe 80A, 80B into a main conveying pipe section 100A, 100B by means of the suction/pressure difference and/or the conveying air flow achieved by at least one pump device 118A, 118B and in which method a main conveying pipe section 100A, 100B is used as a material reservoir and that in a second phase the material transferred into a main conveying pipe section is transferred by means of the suction/pressure difference and/or the conveying air flow achieved by at least one pump device into a separating means 90, 90A, 90B.

According to one preferred embodiment in the method the main conveying pipe is divided into at least two main conveying pipe sections 100A, 100B, which can be connected to two different separating means 90A, 90B, in which case the input points 60 of at least one branch pipe 80A connecting to a first section 100A of the main conveying pipe are emptied at the same time as the emptying of the input points 60 of a second branch conveying pipe 80B connected to a second section 100B of the main conveying pipe.

According to one preferred embodiment in a first phase of the method at least one pump device 118A, 118B is used to transfer the wastes of the input points 60 of the branch conveying pipe 80A, 80B into a section of the main conveying pipe such that with the first pump device 118A the waste material to be emptied from an input point 60 of the branch conveying pipe 80A connected to the first section 100A of the main conveying pipe is transferred and with the second pump device 118B, which is in parallel, the waste material to be emptied from an input point of the branch conveying pipe 80B connected to the second section 100B of the main conveying pipe is transferred.

According to one preferred embodiment in a first phase suction/partial vacuum is achieved in the main conveying pipe or in a section 100A, 100B of the main conveying pipe from two different directions, at least in the proximity of the intersection of the branch conveying pipe 80A, 80B intended to be emptied and the main conveying pipe 100A, 100B.

According to one preferred embodiment the sections 100A, 100B of the main conveying pipe are arranged into one pipe section such that the delivery end of the first pipe section 100A and the delivery end of the second pipe section 100B are connected to a separating means 90 and further to the suction side of at least one pump device 118A, 118B and that the branch conveying pipe is connected to the main conveying pipe, in which case material is transferred conveyed initially from an input point 60 via a branch conveying pipe 80A, 80B into a main conveying pipe section 100A, 100B from the effect of the suction/partial pressure acting from two directions in the main conveying pipe and from the effect of the at least one or more replacement air inlet apertures of the branch conveying pipe 80A, 80B and/or of the input pipe 63.

According to one preferred embodiment in a second phase the wastes transferred into a section 100A, 100B of the main conveying pipe are transferred onwards into a separating means 90, 90A, 90B by connecting the suction side of one of the pump devices 118A, 118B or the suction side of a number of pump devices 118A, 118B to the separating means.

According to one preferred embodiment in the method conveying air can be circulated in a circuit formed by at least a part of the conveying piping with a pump device 118A, 118B, the suction side of which is connected to at least one separating device 90, 90A, 90B and onwards to a section 100A, 100B of the main conveying pipe, on its return side, such that, if necessary, at least a part of the conveying air on the pressure side of the pump devices is led into the circuit, into the section 100A, 100B of the conveying pipe on the output side.

According to one preferred embodiment in the method a partial vacuum is achieved in the circuit with at least one pump device 118A, 118B, such as with a partial-vacuum generator and/or a fan, the suction side of which is connected to a separating means 90, 90A, 90B or to a conveying pipe 100A, 100B, 111A, 111B, 112BA, 112AB; 111 leading to it via an air duct 117A, 115A, 113A; 117B, 115B, 113B, 131; 115, 113.

According to one preferred embodiment the circulation of air in a circuit, which comprises at least a part of the conveying piping 100A, 100B, is adjusted and/or controlled and/or opened or closed with closing means/adjustment means, such as with valve means 103, 110A, 110B, 114A, 114B, 131, 116A, 116B, 121A, 121B, 129A, 129B, 114, which are arranged in the circuit.

According to one preferred embodiment the material to be conducted from a feed-in container 61 of an input point 60 into an input pipe 63 and onwards into a branch conveying pipe is processed with a shaping device 64, such as with a rotary shaper.

According to one preferred embodiment in the method the air circulation is adjusted by connecting it, if necessary, into the opposite direction in at least a part of the circuit, which part is formed by at least a part of a conveying pipe 100A, 100B.

According to one preferred embodiment in the method material is fed in from the input points 60 of material, which are the input points of waste, such as waste receptacles or refuse chutes.

According to one preferred embodiment in the method replacement air is brought into the piping via at least one replacement air duct, which preferably comprises a valve means 101A, 101B; 81A, 81B; 66, 126A, 126B.

According to one preferred embodiment the pressure in the piping is monitored with pressure sensors 130A, 130B and the partial vacuum and/or output achieved by the pump device (s) is controlled, in which in at least a part of the operating area of the pump device(s) the pressure to be achieved in the piping with the pump device(s) times the output achieved by the pump device(s), i.e. the volume flow rate (p×Q), is constant.

The invention also relates to a pneumatic material conveying system, such as a waste conveying system, which material conveying system comprises at least one input point 60 of material, more particularly of waste material, a material conveying pipe, which can be connected to the input point 60, and at least one separating device 90A, 90B, in which the material to be conveyed is separated from the conveying air, and also means for achieving a pressure difference and/or a conveying air current in the conveying pipe at least during conveyance of the material, which means for achieving a pressure difference and/or a conveying air current comprise at least one pump unit, which comprises at least one pump device 118A, 118B. The conveying piping comprises at least one main conveying pipe section 100A, 100B and also at least one branch conveying pipe section 80A, 80B, and means for connecting a branch conveying pipe section to a main conveying pipe section 100A, 100B, and that the system comprises means for connecting an input point 60 to a branch conveying pipe section 80A, 80B, and that in the system material is fitted to be transferred initially from an input point 60 via a branch conveying pipe 80A, 80B into a main conveying pipe section 100A, 100B by means of the suction/pressure difference and/or the conveying air flow achieved by at least one pump device 118A, 118B such that the main conveying pipe section 100A, 100B is fitted to be used as a material reservoir and that in the system the material transferred into a main conveying pipe section 100A, 100B in a second phase is fitted to be transferred by means of the suction/pressure difference and/or the conveying air flow achieved by at least one pump device into a separating means 90, 90A, 90B.

According to one preferred embodiment the main conveying pipe is divided into at least two main conveying pipe sections 100A, 100B, which are fitted to be connected to two different separating means 90A, 90B, in which case the input points 60 of at least one branch pipe 80A connecting to a first section 100A of the main conveying pipe are fitted to be emptied at the same time as the emptying of the input points 60 of a second branch conveying pipe 80B connected to a second section 100B of the main conveying pipe.

According to one preferred embodiment in the system in a first phase at least one pump device 118A, 118B is fitted to be used to transfer the wastes of the input points 60 of the branch conveying pipe 80A, 80B into a section of the main conveying pipe such that with the first pump device 118A the waste material to be emptied from an input point 60 of the branch conveying pipe 80A connected to the first section 100A of the main conveying pipe is transferred and with the second pump device 118B, which is in parallel, the waste material to be emptied from an input point of the branch conveying pipe 80B connected to the second section 100B of the main conveying pipe is.

According to one preferred embodiment in a first phase suction/partial vacuum is fitted to be achieved in the main conveying pipe or in a section of the main conveying pipe from two different directions, at least in the proximity of the intersection of the branch conveying pipe 80A, 80B intended to be emptied and the main conveying pipe 100A, 100B.

According to one preferred embodiment the sections of the main conveying pipe are arranged into one pipe section such that the delivery end of the first pipe section 100A and the delivery end of the second pipe section 100B are connected to a separating means 90 and further to the suction side of at least one pump device 118A, 118B, and that the branch conveying pipe is connected to the main conveying pipe, in which case material is fitted to be transferred initially from an input point 60 via a branch conveying pipe 80A, 80B into a main conveying pipe section 100A, 100B from the effect of the suction/partial pressure acting from two directions in the main conveying pipe and from the effect of the at least one or more replacement air inlet apertures of the branch conveying pipe 80A, 80B and/or of the input pipe 63.

According to one preferred embodiment in a second phase the wastes transferred into a section 100A, 100B of the main conveying pipe are transferred onwards into a separating means 90A, 90B by connecting the suction side of one of the pump devices 118A, 118B or the suction side of a number of pump devices 118A, 118B to the separating means.

According to one preferred embodiment the system comprises means for circulating conveying air in a circuit formed by at least a part of the conveying piping with a pump device 118A, 118B, the suction side of which is connected to at least one separating device 90A, 90B and onwards to a section 100A, 100B of the main conveying pipe, on its return side, such that, if necessary, at least a part of the conveying air on the pressure side of the pump devices is led into the circuit, into the section 100A, 100B of the conveying pipe on the output side.

According to one preferred embodiment a partial vacuum is achieved in the circuit with at least one pump device 118A, 118B, such as with a partial-vacuum generator and/or a fan, the suction side of which is connected to a separating means 90, 90A, 90B or to a conveying pipe 100A, 100B, 111A, 111B, 112BA, 112AB leading to it via an air duct 117A, 115A, 113A; 117B, 115B, 113B, 131.

According to one preferred embodiment the circulation of air in a circuit, which comprises at least a part of the conveying piping 100A, 100B, is adjusted and/or controlled and/or opened or closed with closing means/adjustment means, such as with valve means 103, 110A, 110B, 114A, 114B, 131, 116A, 116B, 121A, 121B, 129A, 129B, which are arranged in the circuit.

According to one preferred embodiment the system comprises a shaping device 64, such as a rotary shaper, for processing material to be conducted from the feed-in container 61 of an input point 60 into the input pipe 63 and onwards into a branch conveying pipe.

According to one preferred embodiment the system comprises means for adjusting the air circulation by connecting it, if necessary, into the opposite direction in at least a part of the circuit, which part is formed by at least a part of the conveying pipe 100A, 100B.

According to one preferred embodiment the input points 60 of material are the input points of waste, such as waste receptacles or refuse chutes.

According to one preferred embodiment at least one valve means 62 is between an input point 60 and a conveying pipe 100, by opening and closing which valve means the input of material and/or replacement air into the conveying pipe is adjusted.

According to one preferred embodiment the system comprises at least one replacement air duct, which preferably comprises a valve means 101A, 101B; 81A, 81B, for bringing replacement air into the piping.

According to one preferred embodiment the system comprises a pressure sensor 130A, 130B and control means for controlling the partial vacuum and/or output achieved by the pump device(s) such that in at least a part of the operating area of the pump device(s) the pressure to be achieved in the piping with the pump device(s) times the output achieved by the pump device(s), i.e. the volume flow rate ($p \times Q$), is constant.

According to one preferred embodiment the operation of the pump device(s) is fitted to be adjustable with a frequency converter.

According to one preferred embodiment in the method pipes are used as the main conveying piping, the diameter of which pipes is typically in the range 100-1000 mm, preferably 300-800 mm, most preferably 450-600 mm. A pipe of the branch conveying piping is typically smaller in its diameter than the pipe diameter of the main conveying piping, typically in the region of 100-500 mm, preferably 200-500 mm, most preferably 300-400 mm. In the embodiment of FIGS. 7-10 a fairly small pipe size in terms of its diameter, typically in the region of 100-500 mm, preferably 200-500 mm, most preferably 300-400 mm, can also be used as the main conveying piping.

The discharge valve of an input point is opened and closed such that material batches of a suitable size are transferred from the input point into the conveying pipe. Material is fed in from an input point, such as from a waste bin or refuse chute, and after it has filled a discharge valve is opened, either automatically or manually.

It is obvious to the person skilled in the art that the invention is not limited to the embodiments presented above, but that it can be varied within the scope of the claims presented below. The characteristic features possibly presented in the description in conjunction with other characteristic features can, if necessary, be used separately to each other.

The invention claimed is:

1. A method for pneumatically conveying waste material through a conveying system which comprises, in a first phase,
   introducing waste material from a plurality of input points to a plurality of branch conveying pipe sections; and
   conveying the waste material from said branch conveying pipe sections to a plurality of main conveying pipe sections; and, in a second phase,
   conveying the waste material from the main conveying pipe sections to a separating device or a plurality of separating devices; and
   providing a pump unit or a plurality of pump units which are operatively connected to the separating device or the separating devices and to the branch and main conveying pipe sections for producing a pressure differential and air current within the operating, conveying system, whereby, in the first phase, the waste material is initially transferred from the input points via the branch conveying pipe sections to the main conveying pipe sections and, in a second phase, the waste material is transferred from at least one of the main conveying pipe sections to a separating device by suction/pressure difference and/or conveying air flow produced by said pump device, and waste material transferred to other main conveying pipe sections is retained in at least one of said other main conveying pipe sections, said separating device functioning to separate the waste material from the conveying air.

2. The method according to claim 1, wherein at least two main conveying pipe sections are connected to two different separating devices, in which case, the input points of at least one branch conveying pipe section connected to one of the main conveying pipe sections is emptied at the same time as the emptying of the input points of another branch conveying pipe section connected to another main conveying pipe section.

3. The method according to claim 1, wherein in said first phase a first pump device is used to transfer the waste material of the input points of the branch conveying pipe sections into one of the main conveying pipe sections such that with the first pump device, the waste material is emptied from an input point of the branch conveying pipe section and is transferred to one of said main conveying pipe sections, and a second pump device, which operates in parallel to the first pump device transfers the waste material to be emptied from an input point of the branch conveying pipe sections to another main conveying pipe section.

4. The method according to claim 1, wherein in the first phase a suction/partial vacuum is achieved in the main conveying pipe section from two different directions, in the proximity of the intersection of the branch conveying pipe section intended to be emptied, and the main conveying pipe section.

5. The method according to claim 4, wherein the main conveying pipe sections are arranged such that the delivery ends are connected to the separating device and also to the suction side of at least one pump device, and wherein the branch conveying pipe section is connected to the main conveying pipe section, in which case, material is transferred initially from the input point via the branch conveying pipe section into a main conveying pipe section due to the effect of the suction/partial vacuum acting from two directions in the main conveying pipe section and from the effect of the at least one replacement air inlet aperture of the branch conveying pipe section and/or the input pipe.

6. The method according to claim 1, wherein in the second phase, the waste material transferred into the main conveying pipe section is transferred onwards into the separating device by connecting the suction side of at least one of the pump units to the separating devices.

7. The method according to claim 1, wherein conveying air is circulated in a circuit formed by at least a part of the conveying pipe sections by the pump device, the suction side of which is connected to at least one separating device and to a section of the main conveying pipe section, on its return side, such that, if necessary, at least a part of the conveying air on the pressure side of the pump devices is led into the circuit of the conveying pipe section, on the output side.

8. The method according to claim 1, wherein a partial vacuum is achieved with at least one pump device by a partial-vacuum generator and/or a fan, the suction side of which is connected to the separating device or to a conveying pipe leading to the separating device via an air duct.

9. The method according to claim 1, wherein the circulation of air which comprises at least a part of the main conveying piping section, is adjusted and/or controlled with valve means which are arranged in the circuit.

10. The method according to claim 1, wherein the waste material is introduced from the input point to a shaping device for compacting the waste material.

11. The method according to claim 1, wherein the air circulation is adjusted by directing it in an opposite direction in at least a part which is formed by at least a part of the main conveying pipe system.

12. The method according to claim 1, wherein the waste material is fed from waste receptacles or refuse chutes as input points.

13. The method according to claim 1, wherein replacement air is introduced into the conveying system via at least one replacement air duct which is provided with a valve means.

14. The method according to claim 1, wherein the pressure in the piping sections is monitored and controlled with a pressure sensor and the partial vacuum and/or output produced by the pump device(s), whereby in at least a part of the operating area of the pump device, the pressure to be achieved in the piping sections is substantially constant.

15. The method of claim 1, wherein the main conveying piping section is connectable as a circuit and the main conveying piping section is divisible into at least two conveying pipe sections, wherein in the first phase the suction/partial vacuum is achievable in the proximity of the intersection with the branch conveying pipe section from two directions of the main conveying pipe section when the circuit is open and in a second phase, the conveying of the material is achievable in an opposite direction in the main pipe section when the circuit is closed.

16. The method of claim 1, wherein in the second phase the waste material is simultaneously conveyed from different pipe sections.

17. The method of claim 1, wherein in the second phase the waste material is sequentially conveyed from different pipe sections.

18. The method of claim 1, wherein, in a third flushing phase the conveying pipe sections are connected into a circuit by providing communication between the sections of the main conveying pipe sections.

19. The method of claim 1, wherein at least one of said main conveying pipe sections is a waste material storage.

20. The method for the pneumatic conveying of waste material through a conveying system as defined by claim 1, wherein at least one of the main conveying pipe sections is a waste material storage.

21. A pneumatic waste material conveying system which comprises, as a connected operating system,
 a plurality of input points for introducing waste material;
 a plurality of main conveying pipe sections;
 a plurality of branch conveying pipe sections connecting the input points to the main conveying pipe sections;
 a separating device or a plurality of separating devices communicating with the main conveying pipe sections; and
 a pump unit or a plurality of pump units operatively connected to the separating device or to the separating devices and to the main conveying pipe sections for producing a pressure differential and air current within the operating system, and
 a valve system is disposed in the inlet points, the branch conveying pipe sections and the main conveying pipe sections,
 whereby in a first phase, the waste material is initially transferred from at least one of the plurality of input points via the branch conveying pipe sections to the main conveying pipe sections, and in a second phase, the waste material is selectively transferred from at least one of the plurality of main conveying pipe sections into a separating device by said suction/pressure difference and/or conveying air flow produced by said pump units and waste material to be transferred from other main conveying pipe sections is retained in at least one of the remaining main conveying pipe sections, said separating devices functioning to separate the waste material from the conveying air.

22. The system according to claim 21, wherein the plurality of main conveying pipe sections comprises at least two main conveying pipe sections fitted to be connected to at least two different separating devices, in which case, the input points of at least one branch pipe section connecting to a main conveying pipe section is fitted to be emptied at the same time as the emptying of the input point of another branch conveying pipe section connected to another main conveying pipe section.

23. The system according to claim 21, wherein in the first phase at least one pump device is fitted to be used to transfer the waste material of the input points of the branch conveying pipe section into a section of the main conveying pipe section, such that with the first pump device, the waste material to be emptied from an input point of the branch conveying pipe section is transferred to the first section of the main conveying pipe section with the second pump device, which operates in parallel, and the waste material to be emptied from an input point of the branch conveying pipe section is transferred to the second section of the main conveying pipe section.

24. The system according to claim 21, wherein in the first phase the suction/partial vacuum is effected in the main conveying pipe section or in a section of the main conveying pipe section, from two different directions, in the proximity of the intersection of the branch conveying pipe section intended to be emptied and the main conveying pipe section.

25. The system according to claim 24, wherein the main conveying pipe sections are arranged into one pipe section such that the delivery end of a first pipe section and the delivery end of a second pipe section are connected to a separating device and further to the suction side of at least one pump unit, and wherein the branch conveying pipe section is connected to the main conveying pipe section, in which case, the waste material is fitted to be transferred initially from an input point via a branch conveying pipe section into a main conveying pipe section from the effect of the suction/partial vacuum acting from two directions in the main conveying pipe section and from the effect of the at least one or more replacement air inlet apertures associated with the branch conveying pipe section and/or of the input pipe.

26. The system according to claim 21, wherein in the second phase, the waste material transferred into the main conveying pipe section is transferred into a separating device by connecting the suction side of one of the pump units or the suction side of a number of pump units to the separating device.

27. The system according to claim 21, wherein the pump unit is provided for circulating conveying air in a circuit formed by at least a part of the conveying piping system, the suction side of which is connected to at least one separating device and to the main conveying pipe section, on its return side, such that, if necessary, at least a part of the conveying air on the pressure side of the pump device is led into the circuit, into the conveying pipe section on the output side.

28. The system according to claim 21, wherein a partial vacuum is achieved in the circuit by the pump device with a partial-vacuum generator and/or a fan, the suction side of which is connected to the separating device or to the conveying pipe section leading thereto via an air duct.

29. The system according to claim 21, wherein the circulation of air in the circuit, which comprises at least a part of the main conveying piping section, is adjusted and/or controlled with the valve units which are arranged in the circuit.

30. The system according to claim 21, which further comprises a shaping device for processing the waste material to be conducted from a feed-in container of an input point into an input pipe and into a branch conveying pipe section.

31. The system according to claim 21, further comprising means for adjusting the air circulation by directing it, if necessary, into an opposite direction in at least a part of the circuit, which part is formed by at least a part of the main conveying pipe section.

32. The system according to claim 21 wherein the input points of waste material are waste receptacles or refuse chutes.

33. The system according to claim 21, wherein at least one valve means is disposed between an input point and a conveying pipe section, whereby by opening and closing the valve means, the input of waste material and/or the replacement of air into the conveying pipe section is adjusted.

34. The system according to claim 21, wherein the system further includes at least one replacement air duct which comprises a valve means for bringing replacement air into the piping.

35. The system according to claim 21, wherein the system further includes a pressure sensor and control means for controlling the partial vacuum and/or output achieved by the pump unit, such that in at least a part of the operating area of the pump unit, the pressure to be achieved in the piping is substantially constant.

36. The system according to claim 21, wherein the operation of the pump unit is fitted to be adjustable with a frequency converter.

37. The pneumatic waste material conveying system of claim 21 wherein the main conveying pipe sections are connectible as a circuit and the main conveying pipe sections are divisible into at least two conveying pipe sections, wherein in the first phase the suction/partial vacuum is achievable in the proximity of the intersection with the branch conveying pipe sections from two directions of the main conveying pipe sections when the circuit is open by a valve means, and in the second phase, the conveyance of the material is achievable in an opposite direction in the main conveying pipe sections, when the circuit is closed by a valve means.

38. The pneumatic waste material conveying system of claim 21, wherein, in the second phase, valve means are provided in the conveying system whereby the waste material is simultaneously conveyed from different pipe sections.

39. The pneumatic waste material conveying system of claim 21, wherein in the second phase, valve means are provided for sequentially conveying the waste material from different pipe sections.

40. The pneumatic waste material conveying system of claim 21, wherein in a third flushing phase a valve means is provided for connecting the conveying pipe sections into a circuit by providing communication between the sections of the main conveying pipe sections.

41. The pneumatic waste material conveying system of claim 21, wherein at least one of said main conveying pipe sections is a waste material storage.

42. A pneumatic waste material conveying system which comprises,
a connected operating system including, as components:

a plurality of input containers for introducing waste material, a plurality of main conveying pipe sections, a plurality of branch conveying pipe sections providing selective communication between the input containers and the main conveying pipe sections, a separator or a plurality of separators selectively communicating with the plurality of main conveying pipe sections, a pump unit or a plurality of pump units selectively communicating with each other, with the main conveyor pipe sections and with the separators, and a valve system disposed in the connected operating system and operatively associated with the respective components, whereby due to the suction/pressure difference and/or conveying air flow produced by said pump units in cooperation with the selective use of the valve system, (a) a portion of the waste material is conveyed from the input containers to the separators while a portion of the waste material is temporarily retained in the remaining main conveying pipe sections;

(b) the air blown into the conveying system and the air blown out of the conveying system is efficiently adjusted;

(c) the conveying air circulation is arranged in opposite directions to eliminate clogging of the system;

(d) the material waste is conveyed from the input containers through the conveying pipe sections to the separator or the plurality of separators either simultaneously or sequentially; and (e) the plurality of main conveying pipe sections enables the waste material to be conveyed in opposite directions in different pipe sections.

43. The pneumatic waste material conveying system of claim 27, wherein replacement air couplings are operatively associated with the components of the connected operating system.

44. The pneumatic waste material conveying system of claim 42, wherein a waste material shaper is operatively associated with the input containers.

* * * * *